United States Patent [19]

Walto

[11] 4,190,954
[45] Mar. 4, 1980

[54] CUTTING HEADS

[75] Inventor: Joseph J. Walto, Chaska, Minn.

[73] Assignee: The Toro Company, Bloomington, Minn.

[21] Appl. No.: 920,347

[22] Filed: Jun. 29, 1978

[51] Int. Cl.² .................. A01D 55/18; A01G 3/06
[52] U.S. Cl. ........................................ 30/347; 56/12.7
[58] Field of Search ............... 30/276, 347, 500; 56/12.7, 13.7

[56] References Cited

U.S. PATENT DOCUMENTS

| | | | |
|---|---|---|---|
| 4,054,992 | 10/1977 | Ballas et al. | 30/276 X |
| 4,062,115 | 12/1977 | Lee | 30/276 |
| 4,068,376 | 1/1978 | Briar | 56/12.7 X |
| 4,068,377 | 1/1978 | Kimmel et al. | 30/500 |
| 4,118,865 | 10/1978 | Jacyno et al. | 30/276 |

*Primary Examiner*—Jimmy C. Peters
*Attorney, Agent, or Firm*—Dean P. Edmundson

[57] ABSTRACT

Novel cutting heads are described for apparatus used to cut vegetation and the like. The cutting heads are each adapted to be removably affixed to a rotatable shaft and rotated about an axis generally perpendicular with a cutting plane. At least one non-metallic flexible cutting line is affixed to the novel cutting head, and ramp members are affixed to the head member which are adapted to protect the cutting line retaining means from hitting obstructions in the cutting plane.

9 Claims, 7 Drawing Figures

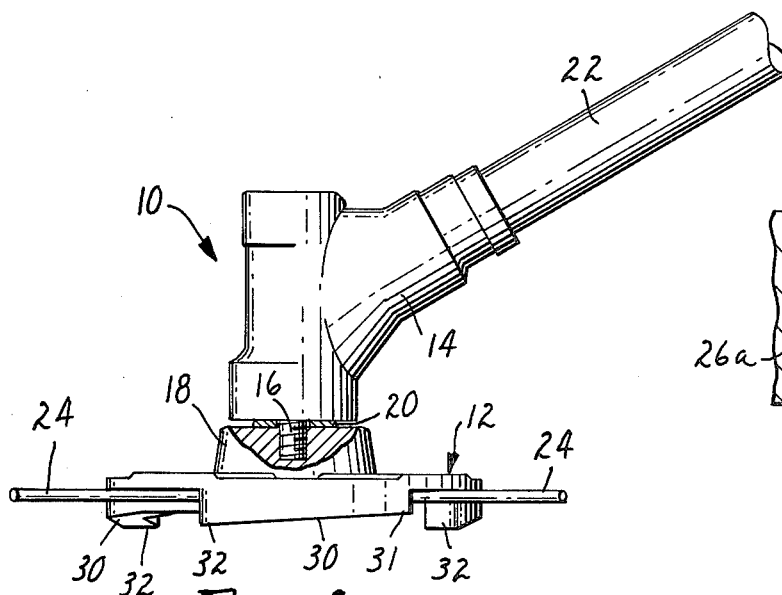
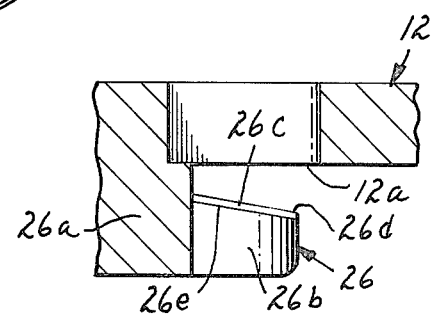
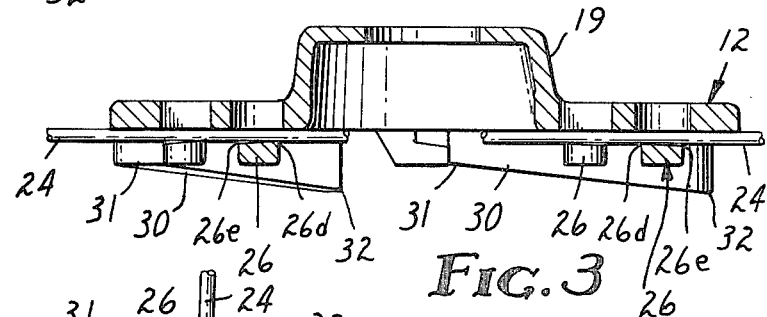
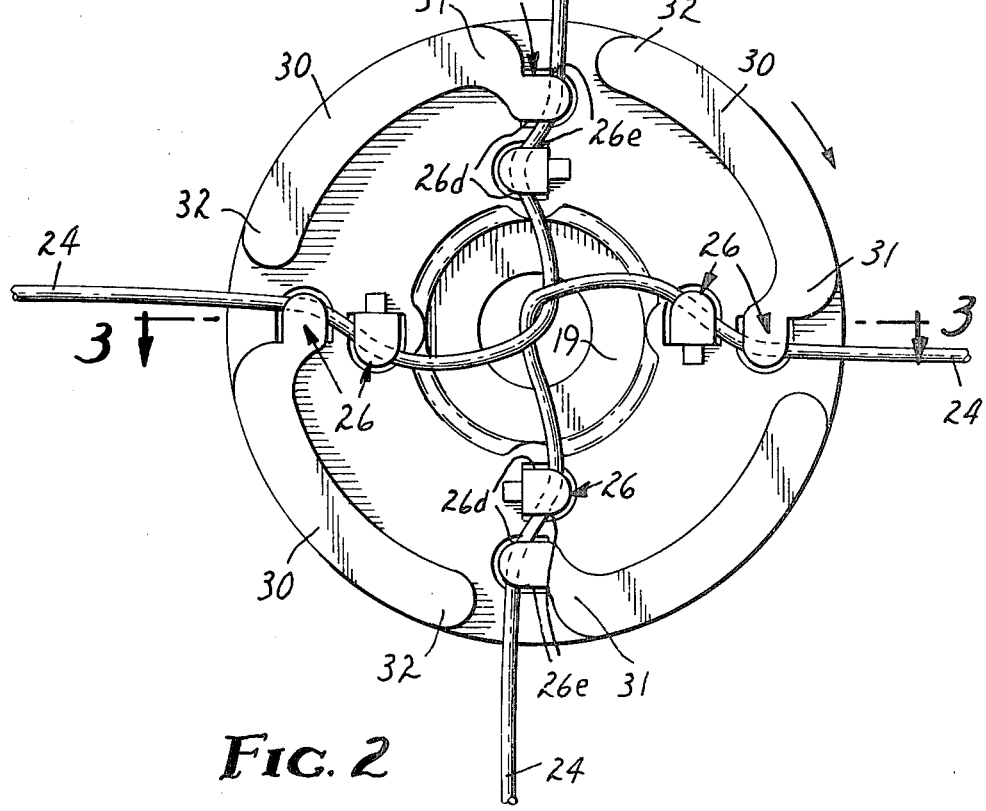

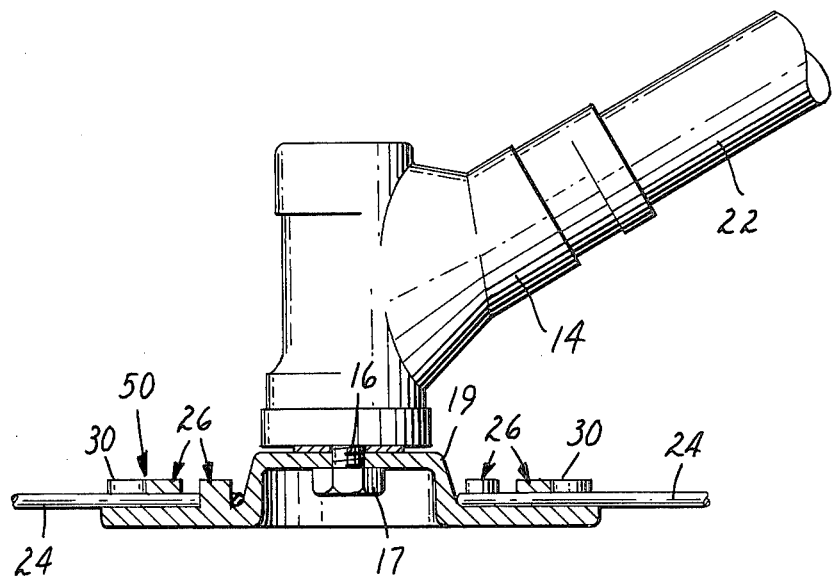
FIG.5
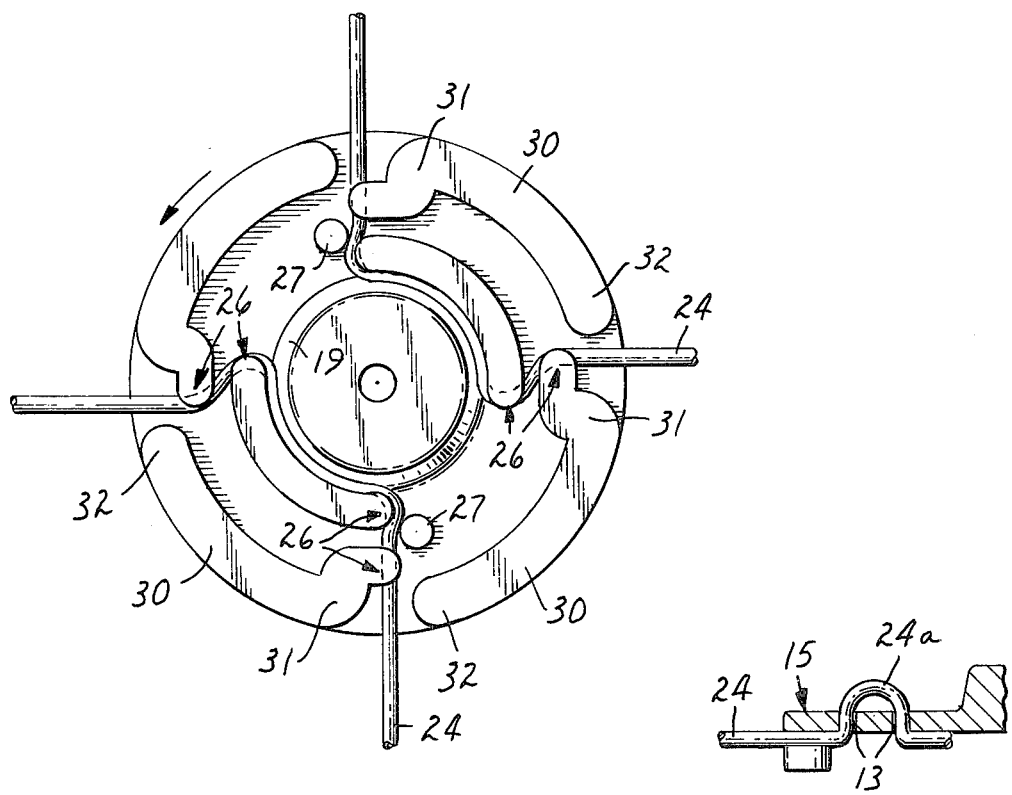
FIG.6
FIG.7

CUTTING HEADS

BACKGROUND OF THE INVENTION

This invention relates for flexible line cutting apparatus of the type used for trimming grass and weeds and other similar vegetation. More particularly, the invention relates to novel rotary cutting heads adapted to be used in conjunction with such cutting apparatus.

Rotary cutting apparatus for cutting grass, weeds and other similar vegetation have been previously described. See, for example, French Pat. No. 1,281,450; U.S. Pat. Nos. 3,693,255; 3,831,278; 3,664,102; 3,708,967; 3,826,068; 3,859,776; 4,035,912; 4,052,789; 4,054,992; and 4,054,993. These types of devices employ plastic cutting lines and are particularly promoted for consumer lawn trimming and edging.

However, some of such devices require the use of specially designed cutting line; other of such devices do not permit easy replacement of cutting line when necessary. The novel apparatus of the present invention overcomes these deficiencies.

SUMMARY OF THE PRESENT INVENTION

In accordance with the present invention there is provided novel apparatus for cutting vegetation and the like. In one embodiment the novel apparatus comprises:
(a) a head member adapted to be removably affixed to a rotatable shaft and rotated about an axis generally perpendicular with a cutting plane;
(b) retaining means mounted on the underside of the head member;
(c) at least one non-metallic flexible line member removably retained on the underside of the head member by the retaining means, wherein at least a portion of the line member extends into the cutting plane; and
(d) at least one ramp member affixed to the head member which is adapted to protect the retaining means from hitting obstructions in the cutting plane during operation of the apparatus.

In another embodiment the novel apparatus comprises:
(a) a head member adapted to be removably affixed to a rotatable shaft and rotated about an axis generally perpendicular with a cutting plane;
(b) retaining means mounted on the upper side of the head member;
(c) at least one non-metallic flexible line member removably retained on the upper side of the head member by the retaining means, wherein at least a portion of the line member extends into the cutting plane; and
(d) at least one ramp member affixed to the upper side of the head member which is adapted to protect the retaining means from hitting obstructions in the cutting plane during operation of the apparatus.

Preferably the retaining means employed in the practice of the present invention comprises a plurality of opposed and cooperating ear members which are adapted to engage and secure the flexible line member against radial displacement from the head member during operation of the apparatus. The flexible cutting line is easily affixed to the cutting head without the use of tools and is also easily removed when replacement is necessary. With the use of the novel retaining means it is not necessary to use specially designed cutting lines nor is it necessary for the cutting lines to be uniform in diameter along their length. Either one or two flexible cutting lines may be used, each of the cutting lines having two free ends which extend beyond the periphery of the head member into the cutting plane. Moreover, the devices of the present invention have ramp members which are adapted to protect the line retaining means from being damaged by hitting of obstructions (e.g. rocks, curbs, etc.) in the cutting plane during operation of the device.

DETAILED DESCRIPTION OF THE INVENTION

The invention is described in more detail hereinafter by reference to the accompanying drawings wherein like reference characters refer to the same parts throughout the several views and in which:

FIG. 1 is an elevational view (with some parts broken away) of a cutting device employing one embodiment of a novel cutting head of the present invention;

FIG. 2 is a bottom view of the type of cutting head shown in FIG. 1;

FIG. 3 is a cross-sectional view of the cutting head of FIG. 2 taken along 3—3;

FIG. 4 is a side view of an ear member which is employed as part of a preferred line retaining means;

FIG. 5 is a cross-sectional side view of a cutting device employing another embodiment of a novel cutting head of the present invention.

FIG. 6 is a top view of the cutting head of FIG. 5; and

FIG. 7 shows another type of retaining means useful in the present invention.

Thus, in FIG. 1 there is shown the head of a cutting device 10 comprising novel cutting head 12 which is detachably mounted to gear housing 14 by means of threaded shaft 16 secured at one end to a conventional gear mechanism in housing 14. Threaded shaft 16 is adapted to thread into a tapped hole in hub 18 of head 12. A lock washer 20 may be utilized as shown to assist in retaining the head 12 tightly affixed to shaft 16 during operation of the device. The gear mechanism (not shown) in housing 14 may be powered by a drive shaft extending through handle member 22 to a conventional gasoline-powered engine affixed to the opposite end of handle member 22. A particularly preferred gasoline-powered engine is a 21 cc. two cycle air cooled engine commercially available from Kioritz Co.

As shown in FIGS. 1-4 one embodiment of the novel cutting device of the present invention comprises head 12 which is adapted to be removably affixed to a rotatable shaft and rotated about an axis generally perpendicular with a cutting plane. The head shown in FIG. 1 is simply screwed onto shaft 16. The head shown in FIGS. 2 and 3 is the same as that shown in FIG. 1 except that hub 19 in FIGS. 2 and 3 is hollow and accordingly does not employ a tapped hole; rather the head shown in FIGS. 2 and 3 is removably affixed to the shaft 16 by means of a conventional nut threaded onto shaft 16 after the hub of the cutting head is slipped onto shaft 16.

Cutting head 12 is preferably made of die cast aluminum. Although other suitable metals may also be used, aluminum is preferred because of its good internal strength and light weight.

Cutting head 12 has retaining means on the underside thereof to engage and secure the flexible line members 24 against radial displacement from the head member during operation of the cutting device. Preferably the retaining means comprise a plurality of opposed and cooperating ear members 26 which are integral with, and project downwardly from, the base of cutting head 12.

Preferably there are four pairs of such ear members symmetrically disposed around the base of head member 12 as shown in FIG. 2. Preferably each of such ears, as best illustrated in FIG. 4, comprises a leg member 26a and an arm member 26b. The flexible line member is captured between face 26c (on arm 26b) and the base 12a of the cutting head 12. Face 26c is preferably sloped so that the gap between face 26c and base 12a of the head 12 is less on side 26d than on side 26e. Face 26c is also sloped from the back to the front. These features enable the use of flexible cutting line that may not be uniform in diameter along its length and also provide for positive retention and securement of the cutting line during high speed rotation of head 12.

The gap between the base 12a and the face 26c, in a preferred embodiment, is about 0.080 inch at its narrowest point on side 26d, about 0.120 inch at the widest point on side 26d, about 0.110 inch at its narrowest point on side 26e, and about 0.150 inch at its widest point on side 26e.

Ramp members 30 are also affixed to the underside of cutting head 12. In the preferred embodiment of FIGS. 1-3 there are four of such ramp members symmetrically disposed on the underside of the head around the periphery thereof. One end 31 of each ramp member typically projects downwardly from the base 12a of head 12 a distance equal to the distance that ear members 26 project downwardly from the base. The other end 32 of each ramp member projects downwardly a greater distance so that the cutting head will ride over obstructions (e.g. rocks, curbs, and the like) in the cutting plane. Consequently the cutting line retaining means are protected from damage. Preferably end 32 of each ramp member projects downwardly a distance approximately 0.25 inch more than end 31.

Non-metallic flexible cutting line 24 is removably retained on the underside of the cutting head 12 by means of opposing and cooperating ear members 26. As shown in FIG. 2 it is preferred to use two cutting lines 24 in such a manner that the two free ends of each cutting line project beyond the periphery of head 12 into the cutting plane.

Each cutting line 24 is retained by two pairs of ear members. As the cutting head is rotated at high speed the cutting line is wedged into the gap under each ear member so that the line is secured against radial displacement outwardly from the cutting head.

Each cutting line 24 may be retained by two adjacent pairs of ear members (as shown in FIG. 2) or by two pairs of ear members which are located directly across head 12 from each other. In the embodiment shown in FIG. 2 the two cutting lines 24 are hooked together or looped across each other intermediate their free ends. This arrangement also assists in securing the cutting lines against undersirable radial displacement from the cutting head during operation.

Removal of used cutting line and replacement with fresh cutting line is very simple effected without the need for tools or special equipment. Rather, fresh cutting line is simply manually pushed under the ear members in the manner shown.

Another embodiment of a novel cutting head of the invention is shown in FIGS. 5 and 6. Thus there is shown cutting head 50 having hub 19 which is adapted to slide onto rotatable shaft 16 where it is secured by nut 17. In this embodiment ear members 26 and ramp members 30 are disposed on the upper side of head 50. Ramp members 30 protect the ear members 26 from hitting obstructions in the cutting plane, e.g. when trimming under fences and the like.

In this embodiment two cutting lines 24 are employed. Each cutting line is retained on cutting head 50 in such a manner that there are two free ends which extend beyond the periphery of head 50 into the cutting plane. One portion of each line 24 is secured to head 50 by means of opposing and cooperating ear members. Another portion of each line 24 is secured to head 50 by means of ear members which are adjacent but which face in the same direction. To assist in holding line 24 under the latter two ear members a post 27 affixed to head 50 may serve as biasing means. The cutting line is easily installed or replaced without the need for tools or special equipment.

FIG. 7 shows an alternative embodiment of cutting line retaining means. In this embodiment the cutting line is passed through two appropriately sized holes or apertures 13 in the cutting head 15 so that line 24 forms a loop 24a. The cutting line may have one free end passing beyond the periphery of the cutting head into the cutting plane, or the line may be fed through additional holes in head 15 so that there are two free ends which pass beyond the periphery of the head into the cutting plane. Preferably the apertures 13 are only slightly larger than the diameter of cutting line 24.

The cutting line used in the novel cutting heads of the present invention is preferably made of nylon or other suitable non-metallic flexible line as is well known in the art. Monofilament cutting line is preferred.

When the novel cutting heads are intended for use in conjunction with apparatus which is powered by a gasoline engine the diameter of suitable non-metallic cutting line is in the range of about 0.080 inch to about 0.200 inch, preferably 0.125 inch to 0.150 inch. When the novel cutting heads are intended for use in conjunction with apparatus which is powered by an electric motor the diameter of the cutting line is in the range of about 0.030 inch to about 0.080 inch, with 0.065 inch being particularly preferred.

The diameter of the novel cutting head is typically in the range of about 4 inches to 6 inches, with 5.5 inches being preferred, when the head is intended for use on a device powered by a gasoline engine. The length of each flexible cutting line which is unsupported (i.e. which extends beyond the periphery of the cutting head) on such head should be in the range of about 4 to 6 inches. Preferably the cutting swath of these heads is about 14 inches for most efficient cutting. Cutting heads used on gasoline powered devices are typically rotated at about 5000 to 8000 revolutions per minute, with 6500 to 7200 revolutions per minute being a preferred speed.

The diameter of the novel cutting head intended for use on devices which are powered by an electric motor is typically in the range of about 2.5 to 4 inches. The length of the unsupported cutting line should be in the range of about 2 to 4 inches. When using small diameter cutting line it is preferred for the cutting head to have a cutting swath of about 7 inches, and when using large diameter cutting line the cutting head should have a cutting swath of about 12 inches for most efficient cutting. Cutting heads used on electrically powered devices typically are rotated at a speed in the range of about 6000 to 11,000 revolutions per minute, with about 8000 revolutions per minute being preferred.

Other variants will be apparent to those skilled in the art without departing from the scope of the present invention.

I claim:

1. Apparatus for cutting vegetation and the like comprising:
   (a) a head member adapted to be removably affixed to a rotatable shaft and rotated about an axis generally perpendicular with a cutting plane;
   (b) retaining means mounted on the underside of said head member;
   (c) at least one non-metallic flexible line member removably retained on the underside of said head member by said retaining means, wherein at least a portion of said line member extends into said cutting plane; and
   (d) at least one ramp member affixed to the periphery of the underside of said head member, said ramp member being adapted to protect said retaining means from hitting obstructions in said cutting plane during operation of said apparatus; wherein said retaining means comprise a plurality of opposed and cooperating ear members which are adapted to engage and secure said flexible line member against radial displacement from said head member.

2. Apparatus in accordance with claim 1, wherein there are two of said non-metallic flexible line members.

3. Apparatus in accordance with claim 2, wherein there are four pairs of said ear members disposed symmetrically on the underside of said head member and four of said ramp members symmetrically disposed on the underside of said head member around the periphery thereof.

4. Apparatus in accordance with claim 1, wherein there are two of said non-metallic flexible line members, each of said line members being removably secured against radial displacement from said head member by two of said pairs of said ear members.

5. Apparatus in accordance with claim 4 wherein said flexible non-metallic line members each have two free ends extending beyond the periphery of said head member into said cutting plane, and wherein said line members are hooked together intermediate their free ends.

6. Apparatus for cutting vegetation and the like comprising:
   (a) a head member adapted to be removably affixed to a rotatable shaft and rotated about an axis generally perpendicular with a cutting plane;
   (b) retaining means mounted on the upper side of said head member;
   (c) at least one non-metallic flexible line member removably retained on the upper side of said head member by said retaining means, wherein at least a portion of said line member extends into said cutting plane; and
   (d) at least one ramp member affixed to the periphery of the upper side of said head member, said ramp member being adapted to protect said retaining means from hitting obstructions in said cutting plane during operation of said apparatus.

7. Apparatus in accordance with claim 6, wherein there are two of said non-metallic flexible line members.

8. Apparatus in accordance with claim 6 wherein said retaining means comprise a plurality of cooperating ear members which are adapted to engage and secure said flexible line member against radial displacement from said head member.

9. Apparatus in accordance with claim 8, wherein there are four pairs of said ear members disposed symmetrically on the upper side of said head member and four of said ramp members symmetrically disposed on the upper side of said head member around the periphery thereof.

* * * * *